United States Patent [19]

Tucker

[11] Patent Number: 5,426,148

[45] Date of Patent: Jun. 20, 1995

[54] FAST-CURLING, HIGH STRENGTH, TWO-PART SEALANTS USING ACETOACETATE-AMINE CURE CHEMISTRY

[75] Inventor: Harold A. Tucker, Shaker Heights, Ohio

[73] Assignee: Tremco, Inc., Beachwood, Ohio

[21] Appl. No.: 234,506

[22] Filed: Apr. 28, 1994

Related U.S. Application Data

[63] Continuation of Ser. No. 993,226, Dec. 18, 1992, abandoned.

[51] Int. Cl.$^6$ ............................ C08K 3/04; C08F 8/32; C08F 16/36
[52] U.S. Cl. .................................. 524/496; 524/592; 524/602; 524/612; 524/906; 525/425; 525/471; 525/939
[58] Field of Search ............... 524/495, 592, 602, 612, 524/906, 496; 525/425, 939, 471; 523/206, 216

[56] References Cited

U.S. PATENT DOCUMENTS

| | | | |
|---|---|---|---|
| 3,017,388 | 1/1962 | Caldwell et al. | 260/65 |
| 4,687,809 | 8/1987 | Kamikaseda et al. | 525/57 |
| 4,708,821 | 11/1987 | Shimokawa et al. | 512/12 |
| 4,929,661 | 5/1990 | Noomen et al. | 524/259 |
| 4,987,186 | 1/1991 | Akiyama et al. | 525/107 |
| 5,017,649 | 5/1991 | Cuscurida | 525/59 |
| 5,017,676 | 5/1991 | Cuscurida | 528/121 |
| 5,021,537 | 6/1991 | Stark et al. | 528/106 |
| 5,051,529 | 9/1991 | Stewart et al. | 560/178 |
| 5,132,367 | 7/1992 | Chan | 525/131 |

FOREIGN PATENT DOCUMENTS 1078883  4/1986  Japan .

OTHER PUBLICATIONS

An article entitled "High Solids Multifunctional Polyols," Eslinger, Delano R., and Ryer, Dennis, from Paint and Coatings Ind., vol. 7, No. 2, pp. 34 and 36, (1991).
An article entitled "Michael Addition Polymers From 1,4 and 1,3 Benzenedimethanol Diacetoacetates and Tripropylene Glycol Diacrylate," Trumbo, David L., from *Polymer Bulletin*, 26 pp. 265–270 (1991).

*Primary Examiner*—Peter A. Szekely
*Assistant Examiner*—Tae H. Yoon
*Attorney, Agent, or Firm*—David P. Dureska; Gunther J. Evanina

[57] ABSTRACT

A fast-curing sealant composition is made from generally liquid oligomers and has good tensile strength, one hundred percent modulus, Shore-A Hardness, and good insensitivity to water. One part of the sealant composition is generally a polyester or polyether oligomer having acetoacetate end groups or functionalities thereon, whereas the second part is also generally a polyester of polyether oligomer generally containing primary amine end groups or functions. The oligomers are generally of a low molecular weight, as from about 500 to about 10,000, and are modified by compounding with various additives such as carbon black, antioxidants, ultraviolet light inhibitors, and the like. Polyfunctional acetoacetate-terminated molecules having 3 or more functional end groups or polyfunctional primary amine-terminated molecules having 3 or more functional end groups serve to increase the crosslink density and modulus of the compositions. The sealant can be used as a coating or as a caulking type compound. One preferred application is automotive windshield sealant.

23 Claims, No Drawings

FAST-CURING, HIGH STRENGTH, TWO-PART SEALANTS USING ACETOACETATE-AMINE CURE CHEMISTRY

This application is a Continuation of application Ser. No. 07/993,226, filed on Dec. 18, 1992, now abandoned by Harold A. Tucker, for Fast-Curing, High Strength, Two-Part Sealants Using Acetoacetate-amine Cure Chemistry.

FIELD OF INVENTION

The present invention relates to a two-part sealant composition made from low molecular weight oligomers, such as polyester or polyether, and utilizes amine-acetoacetate cure chemistry to yield a fast-curing, water-insensitive sealant which is modified with compounding agents such as carbon black. The sealant can be used as a coating or caulking with a preferred application being automotive type windshield sealant.

BACKGROUND

Heretofore, polyurethanes were often used as sealants. However, they inherently had high viscosity making mixing and dispensing difficult. In environments where moisture was present or which contained hygroscopic components, stability problems were incurred using polyurethanes with respect to obtaining a cured sealant of adequate physical properties. They also suffer from large volatile organic emissions to the environment due to organic solvents and low molecular weight volatile reactants.

SUMMARY OF THE INVENTION

A two-part, fast-curing, water-insensitive sealant composition comprises the reaction product of generally an acetoacetate-terminated polyester or polyether oligomer with an amine-terminated polyester or polyether at least at ambient temperatures. The acetoacetate functional oligomer is made by acetoacetylation, using an alkyl acetoacetate such as t-butyl acetoacetate, or by using diketene. These reagents are reacted with the hydroxy-terminated oligomer. The amine-terminated component can simply be a polyamine or acetoacetate-terminated oligomer reacted with generally an excess of a polyamine. The amine of the amine-terminated component is desirably a primary or secondary amine. One or more of the sealant components desirably contains trifunctional, tetrafunctional, etc. components, to effect crosslinking. The sealant composition contains additives therein such as antioxidants, ultraviolet light inhibitors, carbon black, and the like, and has good physical properties such as tensile strength, Shore-A hardness, and 100 percent modulus. The sealant composition can also be used as a coating on a variety of substrates.

DETAILED DESCRIPTION OF THE INVENTION

The fast-cure sealant compositions of the present invention are generally made from a two-part or two-component system. The first part or component generally consists of one or more acetoacetate-terminated polymers or oligomers and optionally low molecular weight acetoacetate-terminated species. For the purposes of this application, polyester and polyethers will refer to both oligomers and polymers. The acetoacetate-terminated component of relatively high molecular weight desirably has a molecular weight of from 500 to 10,000, and preferably from 1,000 to 6,000.

The acetoacetate-terminated components and species polymers are desirably at least 70 wt. % acetoacetate terminated oligomers or polymers of from 500 to 10,000 molecular weight, more desirably they are at least 80 wt. % acetoacetate terminated oligomers or polymers of 500 to 10,000 or desirably 500 to 6,000 molecular weight, and preferably they are at least 90 wt. % acetoacetate terminated oligomers or polymers of 500 to 10,000 molecular weight, or 500 to 6,000 molecular weight. The residual of from 0 to 10, 20 or 30 wt. % are desirably acetoacetate terminated species of less than 500 molecular weight and can be lower molecular weight oligomers or polymers or simply acetoacetate-terminated polyol molecules. These polyols have a molecular backbone desirably of atoms selected from one or more of carbon, oxygen, and nitrogen atoms. These residual polyols can have functionalities of 2 or more and can be used as crosslinking components if they have functionality of 3 or more. The low molecular weight polyols used to make these acetoacetate terminated species are well known to the fields of epoxy and urethane chemistry.

A desirable polyol for making the acetoacetate-terminated oligomer or polymer is a polyether polyol, for example, a poly(oxyalkylene) diol, triol, etc. wherein the alkylene group contains from 2 to 8 carbon atoms with from 2 to 4 carbon atoms being preferred. Generally, the diols are utilized with small amounts of triols functionalities are desired to effect crosslinking. Examples of suitable polyether polyols include polyethylene oxide diol or triol, polypropylene oxide diol or triol, polybutylene oxide diol or triol, polytetramethylene oxide diol or triol, and the like. Preferred polyether polyols include polyoxypropylene polyol per se or end-capped with ethylene oxide. The polyether oligomers of the present invention have a glass transition temperature, Tg, of generally 20° C. less, desirably less than 0° C., and preferably from about −50° C. to about 0° C. The molecular weight of such polyether polyols is from about 500 to about 10,000, and preferably from about 1000 to about 6000. Such oligomers are generally liquid, although some higher molecular weight polytetramethylene oxide diols are semi-solid or even solid.

Low molecular weight polyols which are given acetoacetate terminal groups can also be included to lower the viscosity of if their functionality is greater than 2 to increase crosslinking. These low molecular weight polyol species have a molecular weight under 1500, preferably under 1000, and most preferably under 500, and have 2 or more, and desirably 3 to 5 hydroxyl groups before acetoacetylation. Specific examples include trimethyol propane, tris-hydroxyethyl isocyanurate, glycerine, 1,1,1-trishydroxymethyl ethane, pentaerythritol, dipentaerythritol, N,N,N', N'-tetrakis hydroxypropyl ethylenediamine, and the like. These are also reacted with acetoacetate to produce acetoacetate-terminated species.

In this two component sealant, the crosslinking components (herein defined as components having functionality greater than 2) can be acetoacetate-terminated and thus be included in with the acetoacetate-terminated components, or they can be amine-terminated and thus included in the amine-terminated components. For the high modulus applications like automotive window sealants, high crosslinking yields higher modulus at the same filler level. The crosslinking components for high modulus applications can desirably be from about 60 to about 90 percent of the equivalents of the total amine and acetoacetate functional groups, and preferably from about 70 to about 75 equivalent percent of the total amine and acetoacetate functional groups in the two component sealant. If too few crosslinking components are added, the composition will not solidify. If too much crosslinking component is used, the sealant will be brittle. The crosslinking components can be added to either part of this two component system or distributed between the two components.

Acetoacetate-terminated oligomers can be made from blends of the polyether polyol with other polymers. A particularly suitable blend is that of a polyoxypropylene polyol end-capped with ethylene oxide with colloidal particles of solid polyacrylonitrile suspended in the liquid polyether. The polyacrylonitrile particles furthermore contain hydroxy functional sites on their surface. These surface hydroxy groups are presumed to be caused by polymerizing the acrylonitrile in a polyol media. An example of such a blend is Arco Chemical Company's Arcol 31-28 wherein the polyoxypropylene polyol has a molecular weight of 5,000 and a hydroxy functionality of >2.0 and contains approximately 20 percent by weight of polyacrylonitrile suspended therein. Blends containing copolymer particles of different weight percent polyacrylonitrile would also function in this system. Examples of such commercial products containing copolymers of acrylonitrile and styrene are Arcol 24-32 and Arcol 34-28. The polyacrylonitrile particles are used as a reinforcing filler to enhance modulus in this application. Preferably, the polyacrylonitrile particles are present during the acetoacetylation reaction. Their concentration can be changed by dilution with a polyol. Since the polyacrylonitrile particles have hydroxyls on the surface, they could be acetoacetylated during the acetoacetylation of the polyols. The physical properties of sealants using this technology with polyacrylonitrile particles have physical properties which suggest some bonding of the polyacrylonitrile particles with the acetoacetate-amine cured network. Because the polyacrylonitrile particles function as a reinforcing filler, they will be listed in this text as a reactant and/or filler. When blends of polyether polyols with other polymers are utilized, the other polymer such as polyacrylonitrile particles, may generally exist in amounts of from about 10 to about 30 percent, and desirably from about 20 to about 25 percent by weight of the polyol before acetoacetylation.

Another oligomer which can be utilized in the present invention subsequent to acetoacetylation are the various polyester polyols, such as those made from dicarboxylic acids having from about 2 to about 10 carbon atoms, and preferably from about 2 to about 6 carbon atoms, with a diol or triol having from 2 to 8 carbon atoms, preferably from about 2 to 4 carbon atoms. Specific examples of dicarboxylic acids include succinic acid, malonic acid, glutaric acid, adipic acid, pimelic acid, sebacic acid, suberic acid, azelaic acid, 1,4-cyclohexane dicarboxylic acid, unsaturated diacids such as maleic anhydride and the like. Aromatic diacids and anhydrides meeting the above conditions for diacids such as phthalic acid, phthalic anhydride, isophthalic acid and terephthalic acid can be used in small amounts such as up to 30 mole percent of the diacids, desirably less than 15 mole percent, and preferably not used at all. Examples of suitable diols or triols include ethylene glycol, propylene glycol, butylene glycol, 2-methyl-1,3-propane diol, hexylene glycol, and the like. Preferred polyesters include 2-methyl-1,3-propaneglycol polyadipate. The molecular weight of the polyester polyols is generally from about 500 to about 10,000, and preferably from about 1000 to about 6000, and have a Tg of generally less than 20° C., desirably less than 0° C., and preferably from about −50° C. to about 0° C. Moreover, polyesters made from lactones can be used. The lactones can have from about 5 to about 8 carbon atoms. Caprolactone is preferred, e.g., polycaprolactone diol or triol. Polyester polyols of functionality greater than 2 could be used to increase the crosslink density. If so used as low molecular weight crosslinking components, they could have molecular weights less than about 500.

Blends of different molecular weight polyether polyols or blends of different molecular weight polyester polyols, or blends of polyether polyols with polyester polyols, or blends of polyols of different functionality, including the trifunctional or greater, and blends of polyols with low molecular weight crosslinking components are contemplated.

The above polyether polyols, polyester polyols, and polyols are acetoacetylated in a conventional manner well known to the art and to the literature. Generally, acetoacetylation by ester exchange can be carried out either in the presence of a solvent, or in the absence of a solvent, yielding acetoacetate-terminated oligomers or species. In the absence of a solvent, the reaction temperature is generally from about 100° to about 160° C. with from about 120° to about 150° C. being preferred, generally in the presence of an inert gas sweep such as nitrogen.

When acetoacetylation is utilized with a solvent, the type of solvent is important with regard to determining the limiting reaction temperature. A wide variety of solvents can be utilized such as various hydrocarbon solvents, e.g., heptane, Isopar® E, toluene, xylene, various esters such as butyl acetate, and the like. Although, any $C_1$ to $C_8$ ester of acetoacetate can be utilized, t-butyl ester is preferred due to a short reaction time such as an hour or two, and the ability to azeotrope off the by-product, t-butanol. The acetoacetylation reaction results in transformation of the hydroxyl end group to an acetoacetate end group. The oligomer will generally contain two or more and desirably two or three acetoacetate end groups thereon.

In lieu of utilizing various acetoacetate esters, diketene can also be utilized inasmuch as the same reacts with the above-noted hydroxyl terminated polyesters and polyethers through ring opening, and also produces an acetoacetate end group thereon.

The acetoacetylation reaction is believed to be partly driven by the removal of alcohol by-product from the reaction medium. This is the reason for distilling off the butanol in the examples which shifts the equilibrium of the reaction. In these examples the amount of butanol collected gave some idea of how far the reaction had proceeded.

The use of stannous octoate, stannous dioleate, and other stannous salts with intermediate fatty acids of alkyl or alkylene carboxylic acids, having from 4 to 20 carbon atoms and desirably 6 to 12 carbon atoms if an alkyl carboxylic acid, and having 10 to 20 carbon atoms if an alkylene carboxylic acid, were found to catalyze this acetoacetylation reaction. The examples of the acetylation with and without catalyst shows that small amounts of stannous octoate can enhance the rate of this reaction. This catalyst can be carried forward in the sealant formulation and additionally enhance the reaction rate of the acetoacetate-terminated oligomers with the amine component.

The acetoacetylation reaction with the various polyol oligomers or polyol molecules is very efficient in that generally at least 90 percent conversion, desirably at least 95 percent, more desirably at least 98 percent, and often at least 99 or 100 percent conversion of the hydroxyl-terminated end groups is obtained.

The second part or component of the two-part sealant composition is amine-terminated oligomers or polymers and/or amine-terminated molecules. Only a few amine-terminated oligomers are commercially available. Amine-terminated oligomers can be readily prepared by reacting a polyacetoacetate-terminated oligomers or polymers with an excess of a polyamine.

Generally, any polyamine can be utilized which has two or more amine groups therein, and from about 2 to about 15 or 20 carbon atoms. One group of polyamines can be represented by the formula:

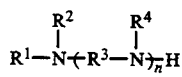

where $R^1$, $R^2$, $R^3$, and $R^4$, independently, is a hydrogen atom or a hydrocarbon radical containing from about 1 to about 15 carbon atoms and n is from about 1 to about 10. Another polyamine is alkylene oxide type oligomers with two or more amine groups. One preferred polyamine is a BASF product made by reacting an acrylonitrile monomer with poly(tetra-hydrofuran) oligomers. Subsequently, the terminal nitrile group is reduced to an amine. The amines causing fast cure times contain terminal amine groups attached to aliphatic methylene carbons. These amines under the conditions typically used can cure in less than 3 days. Examples of fast curing amines are $H_2N$—$(CH_2)_6$—$NH_2$, $H_2N$—$CH_2$—$CH(CH_3)$—$(CH_2)_3$—$NH_2$ (Dytek® A), $H_2N$ $(CH_2)_3$—O—$(CH_2)_n$—O—$(CH_2)_3$—$NH_2$ where n=2 or 4, [$H_2N(CH_2)_3$—O—$CH_2$—$CH_2$]$_2$—O Jeffamine EDR 148. Slower curing polyamines would have secondary amine termination or would have branching on the carbon attached to the terminal nitrogen. Cyclic polyamines can be used. Examples of specific polyamines include ethylenediamine, diethylenetriamine, triethylenetetraamine, propylenediamine, tetraethylenepentamine, hexaethyleneheptaamine, hexylmethylenediamine, 2-methyl-1,5-pentamethylene diamine, and the like. Desirably, only primary polyamine compounds are utilized when fast cure times are desired. Secondary amines give slower cures.

Reaction of the acetoacetate terminated oligomers or polymers with the polyamines to create amine-terminated polyols or polyesters is carried out generally with or without solvents. Toluene, heptane, Isopar® E, xylene and butyl acetate can be used as solvents to minimize viscosity and promote good mixing. Adding the acetoacetate-terminated oligomers to a solution of the amine component is anticipated to minimize any chain extension of the acetoacetate-terminated oligomer. A 2:1 equivalence or more of the amine containing component is mixed with the acetoacetate-terminated oligomer. Thus, the equivalent ratio is generally at least 2, and preferably from about 2 to about 3. During the reaction, water is given off as a by-product and may be removed by simple or azeotropic distillation. Catalysts such as stannous octoate can be used but are not required. An inert atmosphere such as $N_2$ or argon gas can be supplied to minimize oxidation if products of low color are desired. The reaction is exothermic and causes an increase in temperature. Mild heating can be used to accelerate the reaction. Commercially desirable times are from 1 to 4 hours at the temperatures from about ambient to about 100° C.

The exact chemical structure of the acetoacetate-amine product is not known, since some chain extension is expected. The amine-acetoacetate reaction is described in the equation below.

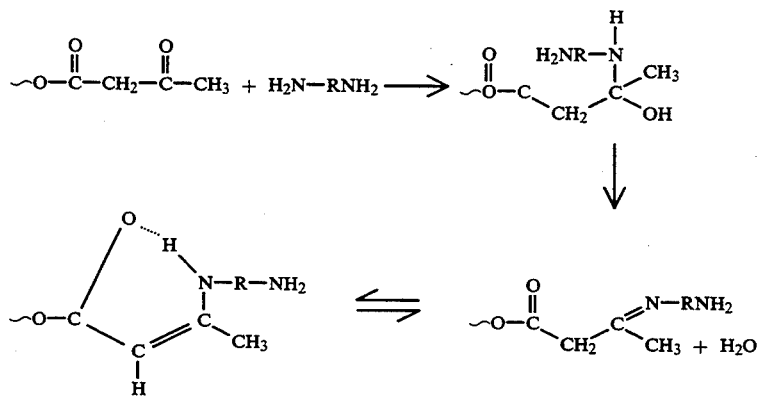

These same reactions occur during the formation of the cured sealant from the two-part system of acetoacetate-terminated oligomers and amine-terminated oligomers.

Thus, the polyamines can be amine-terminated oligomers of alkylene oxides having from 1 to 8, and desirably 2 to 4 carbon atoms per repeat unit or amine-terminated polyesters meeting the structural requirements for acetoacetate-terminated polyesters but being aminated by other procedures. Desirably, the polyamine components are amine-terminated species of which at least 50 wt. %, more desirably at least 60 wt. %, and preferably at least 70 wt. % are amine-terminated oligomers or polymers of 500 to 10,000 molecular weight and desirably 500 to 6,000 molecular weight. These amine-terminated species can be made from the same polyols described for use in the acetoacetate-terminated oligomers or polymers. The amine termination can be achieved by various reactions including going through an acetoacetate-terminated intermediate.

The residual of from 0 to 30, 40, or 50 wt. % of the amine-terminated species desirably are the polyamines of the type previously described of less than 500 molecular weight desirably having a molecular backbone of atoms selected from one or more of carbon, nitrogen and oxygen. These amines are well known.

Desirably the amine-terminated oligomer component contains a small amount of crosslinking agents having three or more end amine groups therein. Examples of suitable amine-terminated crosslinking agents include Dytek ®-A- modified acetoacetylated trimethylol-propane or similarly-modified Tone® 305, a triol of polycaprolactone.

Upon mixing and blending the polyacetoacetate and the amine-terminated oligomer, a reaction readily takes place. Curing temperatures can be controlled by the choice of the amine reactant to give a variety of cure temperatures. The commercially desirable curing temperature of the reaction is generally above 0° C. to about 50° C., desirably from about 15° C. to about 35° C., and preferably from about 20° to about 25° C. The ratio by volume of the polyacetoacetate component and the amine-terminated oligomer component can vary widely, as from about 0.2 to about 5, and desirably from about 0.3 to about 3, as long as a sealant having desired physical end properties is produced. However, inasmuch as most hand held commercial two-part sealant applicators or dispensers require equal volumes of materials of the volumes are generally the same. Equal volumes can be obtained by controlling the average molecular weight of each component, or by increasing the volume of one component by adding the filler or other non-reactive components to the reactive amine-terminated or reactive acetoacetate-terminated component. If calibrated metering equipment is available, unequal volumes can be used as they can be accurately mixed. Batch mixing with adjustment to a working time of 1 hour or more could be used. This method sacrifices fast curing.

Sealant compositions of the present invention generally have a unique combination of fast cure and good water-insensitivity. However, they tend to be soft and therefore require modification for high modulus applications. Accordingly, the softness and modulus of the sealant compositions can be modified by utilizing either in the polyacetoacetate component or the amine-terminated component, or both, sufficient amounts of low molecular weight polyfunctional agents to increase the crosslinked density. Additionally, structural reinforcing agents such as carbon black or hydroxy functionalized polyacrylonitrile particles are utilized in either or both components in a total amount up to about 25 parts by weight, desirably from about 5 to about 22, and preferably about 10 to about 20 parts by weight based upon a total weight of the sealant composition. The type of carbon black can be any black known to the art or to the literature, such as furnace black, lamp black, and the like. High structure black gives higher modulus.

The utilization of crosslinking agents as well as the structural reinforcing agents impart high strength and modulus to the sealant composition. Desirably, effective amounts are utilized, such as those set forth above in equivalent moles of reactive groups, to yield a sealant compositions of the caulking type which has a tensile strength of at least 1,000 psi ($6.90 \times 10^6$ pascals), preferably from about 1000 to about 3000, a 100 percent modulus of at least 100 psi ($6.90 \times 10^5$ pascals), preferably from about 100 to about 600, and a Shore-A Hardness of at least 50, preferably from about 50 to about 60.

Besides increasing crosslink density and adding reinforcing fillers to raise modulus and hardness, this can also be accomplished by incorporating stiff organic acetoacetate-terminated molecules or acetoacetate-terminated molecules which tend to crystallize. Examples of molecules or oligomers which tend to crystallize are polytetramethylene oxide and polycaprolactone. Therefore, even the di-acetoacetates bearing these molecules or oligomers contribute to increased modulus and hardness when they are used in the sealant formulation. Furthermore, the amine-modified derivatives of these same aceto acetate molecules are useful in the same way.

Examples of some polyol molecules or oligomers with stiff chains are the following: cyclohexane dimethanol (Eastman Chemical), low molecular weight cellulose acetate butyrate (Eastman Chemical, 551-0.01 and 553-0.4), polyoxalkylated bis phenol A's (Milliken Chemical, Spartansburg, S.C.), and hexakis methoxymethylmelamine (American Cyanamid's Cymel® 300) modified with an excess of 2-methyl 1,3-propanediol. The acetoacetates of all these polyols raise hardness and modulus of polymers in which they are included.

In addition to the above modifiers and in order to develop suitable end properties, it is advantageous to utilize effective amounts of ultraviolet light stabilizers to improve the stability thereof, such as from about 0.05 to about 5 parts per 100 parts of unfilled sealant. Suitable types of UV stabilizers include substituted formamidine such as Givisorb TM; UV-2; HALS (hindered-amine light stabilizers) such as Tinuvin 292, substituted piperidines 2-hydroxybenzophenones, phenothiazine, 2-(2'hydroxyphenyl) benzotriazoles, benzotriazoles and nickel chelates.

It is likewise advantageous to utilize effective amounts of antioxidants to improve the oxidation resistance of the sealant, as from about 0.05 to about 10 parts by weight, and desirably from about 0.1 to about 5 parts by weight of unfilled sealant. Examples of suitable antioxidants and UV stabilizers, include hindered phenols, substituted quinolines, substituted phenols, phenolic phosphites, amines such as dioctyl diphenyl amine, p-phenylenediamines, dihydroquinolines, and polymerized 1,2-dihydro-2,2,4-trimethyl quinoline.

In addition to the above modifiers, various conventional additives can be utilized which are well known to the art and to the literature, such as adhesion promoters, pigments, plasticizers, viscosity modifiers, colorants and various organic or inorganic fillers such as calcium carbonate, talc, clay, $CaSO_4$, quartz, viscolite, novacite, silicas, mineral fillers, and the like. The adhesion promoters can be various silanes, amino-silane compounds or other known adhesion promoters well known to the art to cause adhesion to glass or other organic or inorganic surfaces. The pigments can be any finely divided pigments used to add volume, color, or hiding power to the acetoacetate-amine sealant composition. The plasticizers can be any of the common plasticizers for polyesters or poly(alkyleneoxides) and can be used in amounts of from about 2 to about 15 percent based upon the weight of the unfilled sealant.

Moreover, various divalent tin catalysts, that is, stannous, compounds are utilized, such as stannous octoate, dioleate, palmitate, oxalate, and those described as catalysts for acetoacetylation reactions. The amount of such tin catalysts is generally from about 0.01 to about 0.10, and preferably from about 0.02 to about 0.03 parts by weight per total 100 parts by weight of the sealant composition. These catalysts accelerate the cure rate of the composition.

The sealant compositions of the present invention are flexible yet have high strength and high modulus. Due to their rapid cure and water-insensitivity, they are desirably utilized in sealant applications wherein moisture or water is encountered or exists within the environment and wherein urethane sealants are not suitable. One specific area of use is as a sealant for windshields of vehicles such as automobiles, trucks, busses, and the like. Another is construction sealants for homes, offices, factories, and warehouses. Still another use is as a concrete sealant for roads, bridges, parking areas, etc.

The invention will be better understood by reference to the following examples.

EXAMPLES

The following ten examples show how the acetoacetylation reaction can be conducted on a variety of polyols including Arcol® 31-28 (wherein polyacrylonitrile particles act as reinforcing fillers subsequent to acetoacetylation). The effect of stannous octoate catalyst can be seen by comparing similar examples that do and do not make use of the catalyst.

Acetoacetylation of Oligomers

Example 1

Arcol® 31-28 Without Catalyst. The Arcol® 31-28 polyol used had a hydroxyl function concentration of 0.496 milliequivalants per gram (meq/g), and the t-butyl acetoacetate used had an ester functional group concentration of 6.28 meq/g, taking into account its purity. 207 g (103 meq) of Arcol® 31-28 and 16.8 g (106 meq) of t-meg-acetate were charged to a flask which was equipped with a stirrer, thermometer, nitrogen inlet, a simple distilling head with another thermometer, and a receiver. The receiver was connected to a gas bubble counter to indicate nitrogen flow. The receiver was packed in ice. With a nitrogen flow of about one bubble per second, the reaction mixture was heated to 130° C. and held there using a thermostat. No distillate was observed for about 25 minutes under those conditions. Then, the $N_2$ flow was stopped and the receiver was connected to a water aspirator through a line with a controlled leak. The leak was gradually closed during a period of one half hour until the final pressure was 37 mm of Hg. Slow distillation of t-butanol from the reactor was observed during this time, but distillation then stopped at this final pressure. The weight of the distillate was 4.9 g, 62.8 percent of that expected for the completion of the ester exchange reaction. The product recovered was an opaque, yellow orange, viscous liquid weighing 209.7 g. The material balance for the procedure was 95.9%.

Example 2

Arcol® 31-28 With Stannous Octoate Catalyst.

Materials of the same commercial lot number as used above were used again, the same apparatus was used and the same general procedure was carried out once more. 202 g (100 meq) of Arcol® 31-28, 15.9 g (100 meq) of t-butyl acetoacetate, and 0.1 g of stannous octoate were charged to the flask. At a temperature of about 125° C. in the flask, distillation of t-butanol was observed. That temperature was held with a thermostat for the course of the reaction. Distillation was allowed to continue slowly for 40 min. at atmospheric pressure. Then, as before, the pressure was gradually reduced to 25 mm of Hg during one half hour. The weight of the distillate was 6.0 g., 81.1 percent of the weight of t-butanol by-product expected. Weight of product recovered was 210.8 g. The materials balance was 96.7 percent.

Example 3

Arcol® 31-28 and Trimethylolpropane With Stannous Octoate Catalyst.

The same procedure described above was applied to the acetoacetylation of a mixed batch of Arcol® 31-28 and trimethylol propane. 2419 g (1.200 equiv.) of Arcol® 31-28, 146 g of trimethylol propane (3.23 equiv.), 707.6 g (4.44 equiv.) of t-butyl acetoacetate, and 4.4 g of stannous octoate were charged to the flask. The reaction was run at a constant temperature of 120° C. Heating and t-butanol distillation continued for 1½ hours at atmospheric pressure. The pressure was reduced gradually to 23 mm of Hg over an additional 1¼ hours while more t-butanol was distilled over. Approximately 313.1 g of distillate was collected, 95.2 percent of the theoretical weight. Product weight recovered was 2867 g, giving a materials balance of 97 percent. The Brookfield viscosity of the product at 2 RPM and 25° C. was 2560 cps. Base titration of the product for acetoacetate functionality gave 1.40 meq/g theory 1.50 meq/g. HPLC analysis for unreacted t-butyl acetoacetate gave 0.50 % by weight.

Example 4

PPG-1025 Without Catalyst.

204 g (0.400 equiv.) of PPG-1025 (1.96 meq./g) and 65.6 g (0.412 equiv.) of t-butyl acetoacetate were charged to the flask. PPG-1025 is a poly(propylene oxide) diol of nominally 1000 molecular weight. No distillation of t-butanol was observed until the pot temperature reached 140° C. At that point, the temperature was raised slowly to 150° C. during 1¾ hours. Then, while maintaining that temperature, the pressure was gradually reduced to 21 mm Hg during ¾ hours. The weight of distillate was 29 g, apparently 95.1 percent of weight of for t-butanol. However, a small part of the distillate came over about 80° C. at about 25 mm. The product recovered weighed 237 g giving a material balance of 98.7 percent. The Brookfield viscosity was 160 cps at 2 RPM and 25° C. It was a clear light yellow liquid.

Example 5

PPG-1025 With Stannous Octoate Catalyst.

204 g (0.400 equiv.) of PPG-1025, 63.7 g (0.400 equiv.) of t-butyl acetoacetate, and 0.2 g stannous octoate were charged to the flask. Distillation of t-butanol was observed beginning at a pot temperature of 120° C. The temperature was held there for an hour while distillate was collected under atmospheric pressure. Then the pressure was gradually reduced to 198 mm of Hg during another hour. The temperature was raised to 125° C. and the pressure reduction continued to 22 mm of Hg during still another hour. The distillate collected weighed 28.7 g, 97 percent of theory. No high boiling liquid was observed coming over at the end this time. The weight of product collected was 235.5 g. The materials balance was 99.7 percent. Base titration for acetoacetate gave 1.63 meq/g, theory 1.68 meq/g. HPLC analysis for unreacted t-butyl acetoacetate gave 0.327% by weight.

Example 6

Polymeg ® 1000 Without Catalyst.

2383 g (4.88 equiv.) of Polymeg ® 1000 (2.05 meq. g) and 776.5 g of t-butyl acetoacetate were charged to the flask and heated to 120° C. Polymeg ® 1000 is a poly(-tetrahydrofuran) diol of approximately 1000 molecular weight. Distillate came over rapidly initially and the temperature was maintained while distillation was conducted under atmospheric pressure for 1½ hours. Pressure reduction then began. In 1½ hours more the pressure was 32 mm of Hg. The temperature was then raised to 125° C. and heating under vacuum continued for ¼ hour, 349 g of distillate was collected, 96.7 percent of the theoretical weight. The weight of product collected was 2733 g. The materials balance was 97.6 percent.

Example 7

Trimethylolpropane Without Catalyst.

45 g of trimethylol propane (1.00 equiv.) and 159 g t-butyl acetoacetate (1.00 equiv.) were charged to the flask. The pot temperature was held at 120° C. while distillate was collected at atmospheric pressure for 1½ hours. The temperature was maintained at 120° C. while the distillation was continued under gradually decreasing pressure until it reached 27 mm of Hg after another 1¾ hours. The distillate collected weighed 74.1 g, 100 percent of the theoretical. The weight of the product recovered was 122.8 g. The materials balance was 96.5 percent.

Example 8

BASF Pluracol ® 220 With Stannous Octoate Catalyst.

Pluracol ® 220, 212.3 g (100 meq.) and t-butylacetoacetate, 19.9 g (100 meq.), were charged to the flask and heated. Pluracol ® 220 is an ethylene oxide end capped poly(propylene oxide) of nominally 6000 molecular weight having poly functionality. The reaction mixture was observed at 125° C. pot temperature for 15 minutes. No t-butanol distillate appeared; 0.1 g stannous octoate was added to the flask. After another 10 minutes, only a very slow distillation was observed, 0.2 g more catalyst was added and the temperature was raised to 130° C. Slow distillation was allowed to continue for one half hour more at atmospheric pressure. Then reduction of the pressure was decreased to 22 mm of Hg in about one hour. The 7.5 g of distillate collected amounted to 101 percent of theoretical amount for t-butanol. The product weighed 225.5 g. It was a clear, slightly yellow liquid with a Brookfield viscosity of 1600 cps at two RPM and 26° C. The materials balance for this reaction was 97 percent.

Example 9

Arco's 2-Methyl-1,3-propanediol "MP Diol" Without Catalyst.

MP Diol, 45 g (1.00 equiv.) and t-butyl acetoacetate, 159 g (1.00 equiv.) were heated to 120° C. in the flask. Very rapid distillation of t-butanol was observed beginning at 117° C. After one hour, the rate of distillation slowed, pressure reduction was begun and continued for ¾ of an hour when the pressure was 42 mm of Hg and the reaction was shut down. The distillate weighed 75 g, 101 percent of the theoretical t-butanol expected. The product collected was a mobile liquid weighing 126.7 g. The materials balance was 98.9 percent.

Example 10

Union Carbide's Polycaprolactone Triol (Tone ® 305) Without Catalyst.

Tone ® 305, 108.7 g (600 meq.) and t-butylacetoacetate, 98.2 g. (618 meq.) were heated to 130° C. in the flask. Tone ® 305 has a nominal molecular weight of 540. Rapid distillation of t-butanol was observed beginning at 112° C. Distillation at atmospheric pressure was continued for 35 minutes. Then, pressure reduction was begun and the pressure was decreased gradually to 18 mm during ½ hour. 46.2 g of distillate was collected, 101 percent of theoretically expected t-butanol. The product was a nearly colorless, mobile liquid. The materials balance was 98.3 percent.

Acetoacetylation in Solvents

The following seven examples show how the acetoacetylation can be conducted in a solvent either with or without a catalyst.

Example 11

Arcol ® 31-28 and Trimethyol Propane Without Catalyst.

The Arcol ® 31-28 polyol used had a hydroxyl function concentration of 0.496 milliequivalents per gram (meq./g). The trimethylol propane had a functionality of 21.99 meq./g. The t-butylacetoacetate had a functionality of 6.28 meq./g taking into account its purity. The reactor was a one liter four-necked flask equipped with a stirrer; electric heating mantle; thermometer; eight-inch vacuum jacketed, packed fractionating column; and a distilling head with built-in condenser and a stopcock to control distillate take-off. A nitrogen inlet and outlet was provided so the reaction was run under a nitrogen blanket. The Arcol ® 31-28 (403.3 g, 0.200 equiv.), trimethyol propane (20.8 g, 0.467 equiv.), t-butyl acetoacetate (107.3 g, 0.667 equiv.), and 94 g of toluene were charged to the reactor and heating was started. Distilling started when the pot reached 115° C. and the distilling head was 79° C. The reaction was continued for 1.5 hours after distilling started. A reflux ratio of about 20:1 was maintained as toluene and butanol were distilled off. The reaction was stopped when the pot temperature reached 156° C. and the distilling head was 107° C. The product was cooled under nitrogen until it was 120° C. and then it was poured into a storage container. 521 g of product was collected along with 89.9 g of distillate. Combining these two amounts and dividing by the initial reactants indicated a material balance of 97.7 percent.

Gas chromatograph analysis of the distillate showed that 95 percent of the theoretical t-butanol for 100 percent conversion was collected. An unfilled vulcanizate using the product in a standard formulation gave a Shore A hardness of 35. The acetoacetate-terminated oligomer was 90 percent solids and had a Brookfield viscosity, at 2 RPM and 24° C. of 960 cps.

Example 12

Arco's Polyol PPG-1025 Without Catalyst.

This reaction was run in a 2 liter flask equipped as in Example 11. PPG-1025 (1010 g, 2.0 equiv.), t-butyl acetoacetate (323 g, 2.0 equiv.), and 235 g of toluene were charged into the flask. This reaction took 5 hours after reaching a pot temperature of 135° C. and a head temperature of 80° C. The pot temperature at the end of the reaction was 160° C. while the distilling head temperature was 106° C. The weight of the distillate collected was 236 g, while the product weighed 1318 g. This gave a material balance of 99 percent. Gas chromatography of the distillate showed a little more than 100 percent removal of the theoretical t-butanol. The viscosity of the product at 89 percent solids, 2 rpm, and 21° C. was 40 cps.

Example 13

Arcol® 31-28 Without Catalyst.

The same apparatus and general procedure as in Example 11 was used again, but this time only one polyol, Arcol® 31-28, was charged. Arcol® 31-28 2400 g (1190 meq.) t-butyl acetoacetate 191 g (1200 meq.) and toluene 456 g. (15 percent by weight of the total recipe) were charged to the flask. The reaction mixture was heated with total reflux, initially. Under those conditions, the temperature at the distillation head was 79° C. Then distillate was removed slowly and at a high reflux ratio by adjusting the stopcock on the distillation head so that it was only partially open. Distillation continued for 4¼ hours. During that time the pot temperature rose from 122° C. to 145° C. and the head temperature from 79° C. to 108° C., close to the boiling point of pure toluene. At this point, the reaction was shut down. The weight of the distillate was 199 g. Calculation from the chromatographic analysis of the distillate showed that 88 percent of the t-butanol expected from theory was collected. The product weighed 2799 g. Neglecting the small amount of unremoved t-butanol, the volatiles in the product were estimated at 12 percent. At this dilution, the product had a Brookfield viscosity of 640 cps at 2 RPM and 24° C. The materials balance for the procedure was 98.3 percent.

Example 14

Arcol® 31-28 Without Catalyst.

Arcol® 31-28, 581.1 g (297.5 meq.), t-butyl acetoacetate 48.5 g. (300.5 meq.), and Isopar® E, 70.0 g. (10 percent of the weight of the total charge) were heated to total reflux in the apparatus. Under those conditions the pot temperature was 123° and the head temperature 81° C. Distillate was removed keeping the reflux ratio high. Distillate removal continued for two hours during which time the pot temperature rose to 178° C. and the head temperature rose to 116° C. The reaction was shut down. Weight of the distillate was 59.9 g. GC analysis showed 105 percent of the expected t-butanol was collected. The weight of recovered product was 590 g. Estimated volatiles in it were 5 percent. Its Brookfield viscosity was 1760 cps at 2 RPM and 21° C. Materials balance for the run was 92 percent.

Example 15

Trimethylol Propane Without Catalyst.

Trimethylol propane, 181 g (4.00 equiv.), t-butylacetoacetate 643 g (4.04 equiv.), and 206 g of toluene, (20 percent by weight of the total charge) were heated to total reflux in the apparatus. Under these conditions, the pot temperature was 117° C. and the head temperature 79° C. Distillate was removed maintaining a high reflux ratio for six hours. At that time, the pot temperature was 151° C. and the head temperature was 107° C. The reaction was shut down. The weight of distillate collected was 446 g and GC analysis showed it contained 105 percent of the t-butanol expected from theory. The recovered product weighed 565 g and its estimated volatiles were 10 percent. The materials balance was 98.2 percent.

Example 16

BASF's Trishydroxyethyl Isocyanurate Without Catalyst.

Trishydroxyethyl isocyanurate, 50.2 g (577 meq.), t-butyl acetoacetate, 91.7 g (577 meq.), and 35.8 g of toluene, (20 percent by weight of the total charge) were heated to total reflux in the apparatus. Temperatures were 114° C. in the flask and 79° C. at the head. Distillate was taken off at a high reflux ratio for 1½ hours. When the pot temperature was at 151° C. and the head temperature at 108° C., the reaction was shut down. The distillate weighed 64.7 g. GC analysis showed that 91 percent of the t-butanol expected from theory was collected. The low value may result from the loss of a small amount of distillate during handling. The weight of product recovered was 106 g. The materials balance was 96.1 percent.

Example 17

Poly(2-Methyl-1,3-Propylene Adipate Diol) Without Catalyst.

Poly 2-methyl-1,3-propylene adipate diol, 1000 g (0.674 equiv.), t-butylacetoacetate, 108 g (0.68 equiv.), and 123 g of toluene (10 percent by weight of the total charge) were heated to total reflux in the apparatus. Initial temperatures were 126° C. in the flask and 80° C. at the head. After about two hours, the pot temperature was 160° C. and the head temperature was 106° C. The reaction was shut down. The weight of the distillate was 81.7 g. The product weighed 1128 g. Its volatiles content was estimated at 8 percent and its brookfield viscosity was 12,800 cps at 2 RPM and 21° C. The materials balance for the run was 98.3 percent.

Amination of Acetoacetylated Oligomers

The following five examples show the amination of acetoacetate under different experimental conditions. Example 19 shows a lower product viscosity than Example 18 as a result of the incremental addition of the acetoacetate-terminated component to the amine component. Example 22 shows a similar reduction in viscosity over Example 21 due to incremental additions of the acetoacetate-terminated oligomer.

Example 18

Acetoacetate-Terminated PPG-1025 (Batch process with a 2.7 equivalent ratio of amine to acetoacetate).

The PPG-1025 acetoacetate starting materials contained 10.7 percent heptane and had a acetoacetate function concentration of 1.52 meq./g. 60 g of this liquid (91.2 meq.) was mixed with 14.2 g (244.8 meq.) of DuPont's diamine, Dytek® A. Dytek® A is 2-methyl-1,5-diaminopentane. The two liquids were mixed in a closed glass container and stirred with a magnetic stirring bar at room temperature for about three hours. The reaction mixture increased in viscosity during that time. The final viscosity was 1200 cps at 2 RPM and 22° C.

Example 19

Acetoacetate-Terminated PPG-1025 (Incremental addition of acetoacetate-terminated oligomer to solution of amine. Equivalent ratio of amine to acetoacetate 2.7:1).

A three-neck flask was equipped with a stirrer, thermometer, dropping funnel and $N_2$ inlet and outlet. 90.2 g (1555 meq.) of Dytek® A was added to the flask. 400 g (576 meq.) of acetocetylated PPG-1025 was added to the dropping funnel. The acetoacetate contained 13.8 percent toluene. The amine in the flask was heated to 54° C.; then the acetoacetate addition began, finishing in about three hours. During that time the temperature rose to 67° C. Following the addition, heating of the reaction mixture was continued for about 45 minutes. The recovered product weighed 483 g. It contained, determined by calculation, 13.4 percent volatiles including the water of reaction. Its Brookfield viscosity was 215 cps at 2 RPM and 23° C.

Example 20

Acetoacetate-Terminated PPG-1025 (Incremental addition of acetoacetate-terminated oligomer to a solution of amine. Equivalent ratio of amine to acetoacetate 2.0:1).

The same apparatus as described above was used and the same batch of acetoacetylated PPG-1025 was used. 200 g (288 meq.) of the acetoacetate was added to the dropping funnel. Dytek® A weighing 33.4 g (576 meq.) was added to the flask and it was heated to 42° C. Then the addition of the acetoacetate was begun. The addition took one hour. During that time, the temperature rose to 53° C. On completion of the addition, heating at 53° C. continued for another ¾ of an hour. The recovered product weighed 228 g. Calculated volatiles including the water of reaction were 14.1 percent.

Example 21

Amination of Acetoacetylated Polymeg® 1000 (Incremental addition of acetoacetate-terminated oligomer to solution of amine. Equivalent ratio of amine to acetoaetate 2.1).

The same apparatus was used as for Example 19 above. 700 g (1190 meq.) of acetoacetylated Polymeg® 1000 was added to the dropping funnel. 145 g of Dytek® A (2499 meq.) was added to the flask and heated to 61° C. Addition of the acetoactate from the dropping funnel began and continued for about 1¼ hours. The temperature rose to 70° C. in the first ¼ hour and was held constant for the rest of the addition. 831.2 g of product was recovered indicating a materials balance of 98.4 percent. The liquid had a Brookfield viscosity of 8960 cps at 2 RPM and 22° C.

Example 22

Amination of Acetoacetylated Polymeg® 1000 (Incremental addition of acetoacetate-terminated oligomer to solution of amine. Equivalent ratio of amine to acetoacetate 2.2).

2700 g (4.67 equiv.) of acetoacetylated Polymeg® 1000 was added to the dropping funnel. 590 g (10.17 equiv.) of Dytek® A was added to a flask and heated to 70° C. The acetoacetate was added to the flask during 1½ hours while the temperature held constant at 70° C. Following the addition, the reaction mixture was heated another 20 minutes at 70° C. 3350 g of product was recovered. Its Brookfield viscosity was 4640 cps at 2 RPM and 24° C.

Example 23

Amination of BASF Pluracol® 220 (Batch process, equivalent ratio of amine to acetoacetate of 2.0, with removal of the water by azeotropic distillation).

The acetoacetylated Pluracol® 220 used contained 10 percent by weight of xylene. 200 g of acetoacetylated Pluracol® 220 (82.6 meq.), 9.6 g (165.2 meq.) of Dytek® A, and 20 g (8.7 percent by weight of the reaction mixture) of toluene were mixed in a 500 ml, 3-neck flask. The flask was equipped with a stirrer, thermometer, Dean-Stark water trap, reflux condenser, and an inlet for dry nitrogen. A bubble counter was connected to the end of the system to indicate the flow of the nitrogen. The Dean-Stark trap was filled with toluene initially. The reaction mixture was heated to reflux and water began to collect in the trap. The initial pot temperature was 133° C. After ¾ of an hour, the pot temperature was 158° C. and no further water was collecting in the trap. The total water accumulated was 1.6 g, 7 percent more than expected from theory. 222 g of clear, yellow fluid product was collected. Its Brookfield viscosity was 2000 cps at 2 RPM, 25° C., and a solids content of 82.5 percent.

Preparation and Use of Two Part Sealant

The following seven examples show how the basic components can be formulated into a sealant along with specific examples of the effects of reinforcing fillers (Example 25, 26 and 28); the effect of crosslinking components (Examples 25, 26, 28 and 30); the effect of stoichiometric equivalence of the reactants (Example 27); and the effect of stannous octoate catalyst (Example 29).

Example 24

Pluracol® 220 was acetoacetylated with t-butyl acetoacetate under conditions to give 98 mole percent esterification of the oligomer. A portion of the acetoacetate-terminated oligomer was converted to amine termination by reacting with 2-methylpentamethylenediamine (Dytec® A). Chemically equivalent amounts of the amine-terminated oligomer and the acetoacetate-terminated oligomer were mixed and the total weight was designated 100 parts. To this was added 0.05 parts by weight stannous octoate catalyst and 100 parts by weight calcium carbonate filler. The composition had a pot life of 3 hours. The composition achieved nearly full cure in 24 hours at which time it had 300 percent modulus of 42 psi, ultimate strength of 127 psi, ultimate elongation of 1100 percent, and Shore A hardness of 12.

Other blends showed the pot life could be increased by decreasing the catalyst level.

Example 25

75 parts by weight acetoacetate-terminated Arcol® 31-28, 12 parts by weight acetoacetate-terminated trimethylol propane (TMP) 0.02 parts of stannous octoate, and 13 parts of Raven® 890 carbon black were mixed for 5 minutes at low speed. Then the catalyst was added and mixed for 15 minutes at medium speed while pulling a vacuum. The batch size was 1.3 kg.

80 parts by weight of Dytek® A modified PPG-1025 and 20 parts by weight of Raven® 890 carbon black were mixed in 1.3 kg. batch for 5 min. at low speed and 15 min. under vacuum at medium speed in a Ross mixer.

The two components were put into a twin-tube sealant gun made by Cox and mixed in equal volumes by passing the two components simultaneously through a 0.5 inch diameter 18 element static mixer. The Cox twin tube sealant gun is similar to conventional home use and commercial-use hand-operated caulking or sealant guns except it has two parallel twin tubes, a t-shaped connector leading to a static mixing tube. The mixed sealant had a working time of approximately 15 minutes and a tensile strength of 124 psi after 1 hour. It reached a maximum tensile strength of 1100 psi after 8 hours and a Shore A hardness of 48 after 2 days. Its ultimate elongation was 300 percent.

Example 26

Acetoacetate-terminated oligomers were formulated into an A component and Dytek ® A terminated oligomers made from acetoacetate-terminated oligomers were-formulated into the B components of Table 1. The mixing procedures were similar to Example 22. After mixing and homogenizing the two components in the ratios specified they had the physical properties shown. Tone ® 305 is hydroxy-terminated trifunctional polycaprolactone. TMP is trimethylol propane cross-linking agent. DIDP is diisodecyl phthalate. Raven ® 890 is low-structure carbon black. THF is tetrahydrofuran.

Example 27

To test the effect of stoichiometry of the acetoacetate amine reactants, the equivalent ratio of acetoacetate functional groups to amine functional groups was varied from 0.9 to 1.1 by increments of 0.1 units. The Shore A hardness values were 27, 39, and 27, respectively, indicating the network could generate useful properties even with slight imbalances in the stoichiometry.

weight Isopar ® K (isoparaffinic solvent) were mixed similarly to Example 25 to produce the A component.

72 parts by weight of Dytek ® A modified acetoacetylated Polymeg ® 1000, 18 parts by weight Raven ® 890 carbon black, and 10 parts of Isopar ® K were mixed similarly to Example 25 to produce the B component.

When the A and B components are mixed and allowed to cure, they produce a sealant which cures in less than 18 hours, has a Shore A hardness of approximately 50, and has a tensile strength of 1100 psi.

Example 29

Effect of Stannous Octoate on Cure of Two-Part Sealant.

The acetoacetylated Pluracol ® 220 was 90 percent in xylene and had 0.413 meq./g of functional groups. The amine-terminated oligomer was made by reacting Dytek ® A at a 2.0 ratio of amine to acetoacetate groups, with an acetoacetate-terminated Pluracol ® 220 and had 82.5 percent solids and 0.36 meq./g of functional groups.

A test recipe for cure rates was used that comprises 46.6 parts by weight acetoacetate-terminated Pluracol ® 220, 53.4 parts by weight Dytek ® A-modified acetoacetylated Pluracol ® 220, 100 parts by weight of calcium carbonate, and variable amounts of stannous octoate.

The cure rate is determined by using a gel-point tester made by the Paul N. Gardner Co., Pompano Beach,

TABLE 1

| NBP1341 | Two Part Automotive Sealant Acetoacetylated-Non NCO | | | | | | | | | |
|---|---|---|---|---|---|---|---|---|---|---|
| | Control | a | b | c | d | e | f | g | h | i |
| PART A | | | | | | | | | | |
| Acetoacetylated Polyols | | | | | | | | | | |
| 6200 Mw AA'd PPG triol | 105 | 105 | | | | | | | | |
| 2900 Mw AA'd poly THF | | | 42 | 37.5 | 42 | | | | | |
| 2000 Mw AA'd poly THF | | | — | — | — | 42 | 31 | 34 | | |
| AA'd Tone ® 305 | | | — | — | — | — | 17 | — | | 5.6 |
| AA'd TMP | | | 8 | 12.5 | 8 | 11.4 | — | 12 | 2.8 | |
| Plasticizer (DIDP) | | 20 | | | | | | | | |
| Raven ® 890 | 20 | 24 | 14 | 14 | 14 | 15 | 13.4 | 13 | | |
| PART B | | | | | | | | | | |
| DYTEK ® A Amine modified | | | | | | | | | | |
| 6200 Mw AA'd PPG triol | 100 | 100 | | | | | | | 50 | 50 |
| 2000 Mw AA'd poly THF | | | 107 | 100 | | | | 50 | | |
| 650 Mw AA'd poly THF | | | — | | 50 | | | | | |
| 1000 Mw AA'd poly THF | | | — | | | 100 | 100 | | | |
| Plasticizer (DIDP) | | 24 | | | | | | | | |
| Raven ® 890 | 20 | 25 | 21.4 | 25 | 12.5 | 25 | 25 | 12.5 | 13.2 | 13.9 |
| A/B Ratio by volume | 50/50 | 50/50 | 25/52 | 20/56.5 | 33/30 | 25/46 | 30/46 | 17/54 | 1/23 | 1/11 |
| Crosslink equiv. % ptA | — | — | 70 | 80 | 70 | 70 | 70 | 75 | — | — |
| Physical Properties | | | | | | | | | | |
| Tensile (psi) | 560 | 475 | 1070 | 1700 | 900 | 1490 | 1440 | 2225 | 900 | 972 |
| Elongation (%) | 450 | 2370 | 257 | 326 | 100 | 315 | 175 | 310 | 334 | 760 |
| Modulus | | | | | | | | | | |
| 100% (psi) | 92 | 18 | 379 | 374 | 800 | 380 | 710 | 480 | 192 | 133 |
| 200% (psi) | 185 | 27 | 795 | 887 | — | 886 | — | 1228 | 460 | 243 |
| 300% (psi) | 325 | 36 | — | | | 1405 | — | 2128 | 800 | 360 |
| Tear (pli) | 77 | 57 | | 312 | 107 | 170 | 242 | 368 | 127 | 166 |

AA'd = Acetoacetylated
DIDP = Diisodecyl phthalate
*All the acetoacetate-terminated oligomers in Part B of this table are modified with Dytek ® A.

Example 28

Arcol ® 31-28 (containing polyacrylonitrile particles) in a Sealant.

12 parts by weight acetoacetylated trimethylol propane, 63 parts by weight acetoacetylated Arcol ® 31-28, 15 parts by weight of Raven ® 890 carbon black, 0.04 parts by weight stannous octoate and 10 parts by Fla. The apparatus has an adjustable electronic heater for keeping the test sample, held in a disposable aluminum cup, at a constant temperature. The device has a stirring motor for turning a delta-shaped wire stirrer in the test sample. The stall time for the stirrer marks the end of the test.

A master batch of the above recipe was prepared without catalyst. Before each test, the proper amount of catalyst was mixed into portions of the master batch. A high speed stirrer with a metal serrated mixing blade was used for each mixing.

TABLE II

| Test Results Run at 150° F. in Gardner Apparatus | | | | |
|---|---|---|---|---|
| Stannous octoate catalyst g/100 g of oligomers | 0.031 | 0.046 | 0.062 | 0.077 |
| Polymer gel time, min. | 87 | 61 | 58 | 48 |

Example 30

Formulations with Different Shore A Hardness Values as a Function of Equivalent Percent of Tri-functional Components.

To see the effect of increasing the equivalent percent of functional groups attached to trifunctional reactants several non-filled acetoacetate-amine sealant formulations were made with different amounts and types of trifunctional crosslinking agents. The trifunctional components are acetoacetylated trimethyolprane and Tone ® 305. The equivalent percent trifunctional component is based upon the total equivalent of amine or acetoacetate functional groups. These formulations along with their Shore A hardness and the percent elongation at break are shown in Tables III and IV.

TABLE III

| Example | A | B | C | D |
|---|---|---|---|---|
| Equivalent % trifunctional Component | 60 | 75 | 77 | 65 |
| Wt % Acetoacetylated Tone ® 305 | 0 | 0 | 7.9 | 0 |
| Acetoacetylated Arcol ® 31-28 | 55.1 | 43.0 | 39.6 | 35.4 |
| Acetoacetylated Trimethylolpropane | 5.1 | 7.9 | 4.0 | 7.1 |
| Acetoacetylated Tone ® 305 | — | — | 7.9 | — |
| Acetoacetylated Polymeg ® 1000 | — | — | — | 7.1 |
| Dytek ® A-Modified Acetoacetylated PPG-1025 | 39.6 | 49.0 | 48.3 | 50.3 |
| Stannous Octoate | 0.2 | 0.2 | 0.2 | 0.2 |
| Shore A Hardness | 27 | 30 | 39 | 27 |
| Elongation at break % | 400 | 300 | 250 | 300 |

TABLE IV

| Example | E | F | G | H |
|---|---|---|---|---|
| Equivalent % Tri functional Component | 80 | 60 | 70 | 80 |
| Wt % Acetoacetylated Tone ® 305 | 0 | 12.2 | 13.1 | 7.9 |
| Wt Ratio Aceto/NH₂ | 1.10 | 0.99 | 1.69 | 1.31 |
| Acetoacetylated Pluracol ® 220 | 42.5 | 35.3 | 48.5 | 38.7 |
| Acetoacetylated trimethylol propane | 9.8 | — | — | — |
| Acetoacetylated methylpropanediol | — | 2.1 | — | — |
| Dytek ® A-Modified acetoacetylated Polymeg ® 1000 | 47.6 | 50.2 | 36.5 | 43.3 |
| Stannous Octoate | 0.2 | 0.2 | 0.2 | 0.2 |
| Shore A Hardness | 29 | 27 | 27 | 39 |
| Elongation at Break % | 300 | 250 | 300 | 200 |

While in accordance with the Patent Statutes, the best mode and preferred embodiment has been set forth, the scope of the invention is not limited thereto, but rather by the scope of the attached claims.

What is claimed is:

1. A sealant composition comprising:
a) a first part including an acetoacetate-terminated component comprised of oligomers or polymers made from the acetoacetylation reaction of polyols, wherein said polyols are polyethers or polyesters or both, at least 70 weight percent of said acetoacetate-terminated oligomers or polymers having a molecular weight of from 500 to 10,000; and
b) a second part including an amine-terminated component comprised of polyamines which are oligomers or polymers made from polyethers or polyesters or both, at least 50 weight percent of said amine-terminated polyamines having a molecular weight of 500 to 10,000,
the molecules of said acetoacetate-terminated component and said amine-terminated component having two or more of their respective terminal groups,
said polyethers or polyesters used to make said amine-terminated and said acetoacetate-terminated components having a Tg below 20° C. wherein said sealant cures into a polymeric network within 24 hours of comixing said parts,
said first part further including polymer particles having pendant acetoacetate groups, wherein said polymer particles are polyacrylonitrile or copolymers of acrylonitrile and styrene.

2. A sealant composition comprising;
a) a first part including an acetoacetate-terminated component comprised of oligomers or polymers made from the acetoacetylation reaction of polyols, said polyols being polyethers or polyesters or both, at least 70 weight percent of said acetoacetate-terminated oligomers or polymers having a molecular weight of 500 to 10,000 and;
b) a second part including an amine-terminated component comprised of oligomers or polymers made from polyethers or polyesters or both, at least 50 weight percent of said amine-terminated oligomers or polymers having a molecular weight of 500 to 10,000,
c) 0 to 30 weight percent of acetoacetate-terminated species made from the acetoacetylation reaction of polyol molecules of low molecular weight, said polyol molecules having molecular backbones of atoms selected form one or more of carbon, oxygen, and nitrogen, said acetoacetate-terminated species having a molecular weight less than 500,
d) 0 to 50 weight percent of amine-terminated species having molecular backbones of atoms selected from one or more of carbon, oxygen, or nitrogen, said amine-terminated species having a molecular weight less than 500,
said acetoacetate-terminated component of 500 to 10,000 molecular weight and said acetoacetate-terminated species of less than 500 molecular weight having two or more terminal acetoacetate groups, and
said amine-terminated component of 500 to 10,000 molecular weight and said amine-terminated species of less than 500 molecular weight having two or more terminal amine groups, and wherein said sealant cures into a polymeric network within 24 hours of mixing said two parts;
at least one of said two parts further including carbon black and a transesterification catalyst, wherein said transesterification catalyst accelerates the reaction of the acetoacetate-terminated component with amine-terminated component.

3. A sealant composition according to claim 2, wherein said polyethers are made from ethers having 2 to 4 carbon atoms, and wherein said polyesters are made from dicarboxylic acids having 2 to 6 carbon atoms and diols or triols having 2 to 4 carbon atoms.

4. A sealant composition according to claim 3, wherein one or more of said acetoacetate-terminated component, said acetoacetate-terminated species, said amine-terminated component, and said amine-terminated species contains one or more crosslinking agents, wherein said one or more crosslinking agents have functional end groups, and wherein the functional end groups of said one or more crosslinking agents are from 60 to 90 percent of the total of the amine functional groups and the acetoacetate functional groups in the sealant.

5. A sealant composition according to claim 2, including polymer particles having pendant acetoacetate groups, wherein said polymer particles are polycylonitrile or copolymers of acrylonitrile and styrene.

6. A sealant composition according to claim 2, including an ultraviolet light stabilizer and an oxidation stabilizer and wherein said caulking sealant is a windshield caulk for automobiles, trucks, or buses.

7. A sealant composition according to claim 3, wherein said acetoacetate-terminated component and said amine-terminated component are made from polyethers.

8. A sealant composition according to claim 3, wherein said acetoacetate-terminated component and said amine-terminated component are made from polyesters.

9. A cured sealant composition comprising:
a crosslinked reaction product of a two-component caulking material comprising a first component comprising at least one or more acetoacetate-terminated components, and a second component comprising at least one or more amine-terminated component, said acetoacetate-terminated components being made from acetoacetylation of one or more polyols of polyethers or polyesters; said amine-terminated components being one or more of said acetoacetate-terminated component reacted with diamines, or polyethers or polyesters having amine end groups, and wherein said crosslinked two-component caulking was crosslinked within 24 hours of mixing said two components, the molecules of said acetoacetate-terminated component and said amine-terminated component having two or more of their respective terminal groups.

10. A cured sealant composition of claim 9, wherein said acetoacetate-terminated component is comprised of oligomers or polymers, at least 70 weight percent of which have a molecular weight of from 500 to 10,000 before crosslinking and said amine-terminated component is comprised of oligomers or polymers, at least 50 weight percent of which have a molecular weight before crosslinking of from about 500 to about 10,000.

11. A cured sealant composition according to claim 10, including polymer particles having pendant acetoacetate groups that are reacted into said polymer network simultaneously with crosslinking, wherein said polymer particles are polyacrylonitrile or copolymers of acrylonitrile and styrene.

12. A cured sealant composition according to claim 10, including carbon black and a transesterification catalyst to accelerate the curing reaction and wherein the cured two-component caulking material is used to seal windshields in automobiles, trucks, or buses.

13. A cured sealant composition according to claim 10, including at least one ultraviolet light stabilizer and at least one oxidation stabilizer.

14. A cured sealant composition according to claim 10, wherein the acetoacetate-terminated component includes polymer particles having surface acetoacetate groups and trifunctional crosslinking agents, and wherein the amine-terminated components are polyethers having amine end groups, and wherein said polymer particles are polyacrylonitrile or copolymers of acrylonitrile and styrene.

15. A cured sealant composition according to claim 11, wherein said polyols of polyether or polyester are polyethers.

16. A cured sealant according to claim 9, including in said acetoacetate-terminated components acetoacetate-terminated species having a molecular weight of less than 500 and which are made from the acetoacetylation of polyols.

17. A cured sealant according to claim 16, including reinforcing agents, antioxidants, and U.V. stabilizers.

18. A cured sealant according to claim 17, wherein essentially all of said acetoacetate-terminated polyols having molecular weights of 500 or more are polyethers, and wherein said polyethers have two to five carbon atoms per repeat unit.

19. A sealant composition according to claim 1, including acetoacetate-terminated species which have a molecular weight of less than 500 made from the acetoacetylation of polyols.

20. A sealant composition according to claim 1, including amine-terminated species which have a molecular weight of less than 500.

21. A sealant composition according to claim 19, wherein said acetoacetate-terminated oligomers or polymers having a molecular weight of from about 500 to about 10,000 are essentially made from polyethers having from 2 to 5 carbon atoms per repeat unit.

22. A sealant composition according to claim 19, wherein said amine-terminated oligomers or polymers having a molecular weight component of from about 500 to about 10,000 are the reaction product of acetoacetate-terminated oligomers or polymers and a polyamine.

23. A sealant composition according to claim 19, wherein said amine-terminated oligomers and polymers having a molecular weight of from about 500 to about 10,000 are the reaction product of acetoacetate-terminated oligomers or polymers and a diamine.

* * * * *